INVENTORS
du BOIS EASTMAN
LEON P. GAUCHER
BY
ATTORNEY 2,789,094

United States Patent Office

Patented Apr. 16, 1957

2,789,094

MANUFACTURE OF SYNTHESIS GAS

Du Bois Eastman, Whittier, Calif., and Leon P. Gaucher, Tuckahoe, N. Y., assignors to The Texas Company, New York, N. Y., a corporation of Delaware Application February 20, 1952, Serial No. 272,678

5 Claims. (Cl. 252—376)

This invention relates to a process for the manufacture of gas containing carbon monoxide, hydrogen, and nitrogen. The process of this invention is particularly applicable to the preparation of feed gas for the synthesis of ammonia.

The invention comprises a process for effecting conversion of hydrocarbons, especially hydrocarbons containing from one to four carbon atoms per molecule, into carbon monoxide and hydrogen by reaction with air. Oxygen-enriched air may be used in the process. Throughout this specification, wherever "air" is recited, it will be understood that oxygen-enriched air is also applicable. Natural gas, ethane, propane, and butane are especially suited as hydrocarbon feed to the process. Unsaturated hydrocarbons such as ethylene and propylene, for example, may, if desired, be used in the process.

The synthesis of ammonia from hydrocarbons, steam and air has become of increasing importance in recent years. Natural gas is generally used as the hydrocarbon, from which hydrogen is generated for the ammonia synthesis reaction. In the usual commercial process, natural gas, after treatment for the removal of sulphur compounds, is mixed with steam and passed over a nickel oxide catalyst at a temperature within the range of from about 1,200 F. to about 1,500 F. in externally heated furnace tubes known as the primary reformer. The principal reactions occurring in the reactor or primary reformer are:

$$CH_4 + H_2O \rightarrow CO + 3H_2$$
$$CO + H_2O \rightarrow CO_2 + H_2$$

The generation of hydrogen from hydrocarbons in this manner is known in the art as the steam-methane reaction. Sulphur is a poison for the nickel catalyst, hence its removal is necessary whenever it is present in the hydrocarbon. Hydrocarbons other than methane and natural gas may be used; ethane, propane, butane, and unsaturated hydrocarbons, such as ethylene and propylene, are suitable hydrocarbons for use in the process.

In the conventional commercial process, the effluent gas from the primary reformer is mixed with additional steam and air in an amount sufficient to supply the nitrogen required for the subsequent ammonia synthesis. The resulting mixture is supplied to a secondary reformer usually a refractory lined vessel also containing nickel oxide as catalyst. In the secondary reformer, oxygen from the air combines with hydrogen to produce nitrogen and water vapor:

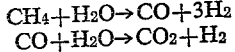
$$Air\ (N_2 + O_2) + 2H_2 \rightarrow N_2 + 2H_2O$$

Carbon oxides are present in the gaseous effluent from the secondary reformer. This gas may be treated for the removal of both carbon monoxide and carbon dioxide to obtain relatively pure hydrogen and nitrogen as synthesis feed gas.

Usually the major part of the carbon monoxide is converted to carbon dioxide with the production of additional hydrogen by utilizing the water-gas shift reaction:

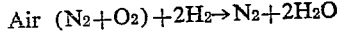
$$CO + H_2O \rightarrow CO_2 + H_2$$

This reaction is usually conducted at about 750° F. with an iron catalyst.

Following the water-gas shift reaction, the gases are then treated for removal of carbon dioxide and carbon monoxide to produce the mixture of substantially pure hydrogen and nitrogen required for the synthesis of ammonia.

Carbon dioxide may be removed by scrubbing the gas with water or an amine, e. g., monoethanolamine, or a combination of these procedures. Carbon monoxide may be removed by scrubbing the gas with a cuprous salt solution, e. g., cuprous ammonium formate, which also removes carbon dioxide. Other cuprous salts may be used. A caustic wash, i. e., contacting the gas with a solution of sodium hydroxide, is also sometimes used to effect substantially complete removal of carbon dioxide from the synthesis feed gas before it is passed to the ammonia synthesis reaction.

The purified gas is compressed to the desired reaction pressure, e. g., 5,000 pounds per square inch gauge and passed at a suitable reaction temperature, e. g., 950° F., over an ammonia synthesis catalyst, for example, magnetic iron oxide promoted with potassium and aluminum oxides, and subsequently reduced to metallic iron.

Some methane appears in the product gas after purification. The methane apparently acts only as an inert diluent in the ammonia synthesis reaction. However, it is essential that the methane be kept at a low value in the feed gas, e. g., below about 0.3 mol percent. This is due to the fact that only limited conversion is obtained per pass in the ammonia synthesis reactor, necessitating recycling of the unconverted gases. Inert gases, chiefly the methane and rare gases from the air build up in the ammonia synthesis reaction system. These gases are eliminated from the system by purging a portion of the recycle gas stream. It is desirable to limit the purge stream to a low value because of the economic loss involved in purging nitrogen and hydrogen which has been produced, purified and compressed at some cost.

It is evident from the foregoing description of a conventional process for the production of ammonia from hydrocarbons, steam and air, that a relatively large percentage of the oxygen in the air introduced into the secondary reformer combines with hydrogen produced in the primary reformer. This represents a waste of hydrogen which has been made at considerable expense. The primary reformer, since it involves catalyst-filled furnace tubes, generally of stainless steel, represents a relatively large investment cost. Very often, the capacity of the ammonia synthesis plant is limited because of limited capacity of the primary reformers. Many plants have excess capacity either already available, or available upon a relatively small additional investment, in the purification and the ammonia systhesis steps of the process.

We have found that it is possible to increase the quantity of synthesis gas available for the production of ammonia by from about 20 to about 50 percent in a plant for producing ammonia synthesis feed gas from hydrocarbons without increasing the steam-methane reactor, or primary reformer. Stated another way, it is possible to reduce, by as much as one-half, the required steam-methane primary reformer installation, in a plant with a given ammonia synthesis capacity. This is accomplished, in accordance with our invention, by the production of a mixture of carbon monoxide, hydrogen and nitrogen in a flow-type gas generator of which we are the inventors, and blending this gas with the gas from the primary reformer in an amount sufficient to supply the nitrogen required for the ammonia synthesis reaction. Such a generator is described in our Patent No. 2,582,938 and in our co-pending application, Serial No. 262,610, filed December 20, 1951, now U. S. 2,701,756. We have found that we may produce a mixture of carbon monoxide, hydrogen, and nitrogen, substantially completely free from carbon and containing only a very small amount of residual methane (within the range which may be tolerated in the ammonia synthesis reaction) and relatively small amounts of carbon dioxide.

This gas may be produced at atmospheric pressure or at an elevated pressure, e. g., on the order of 100 to 500 pounds per square inch gauge, or higher, if desired. Generation of the gas at elevated pressure cuts compression costs by about one-third, as compared with generating the gas at low pressure, and compressing the gas.

One of the objects of this invention is to provide an improved process for the generation of a mixture of hydrogen, carbon monoxide and nitrogen. Another object is to provide an improved process for the generation of a gas comprising hydrogen, carbon monoxide, and nitrogen in the ratio of about three parts hydrogen and carbon monoxide per part of nitrogen. Still another object is to provide an improved process for the production of a mixture of hydrogen and nitrogen in the proper proportions for the synthesis of ammonia.

In accordance with one embodiment of the invention, a feed hydrocarbon, for example, natural gas, and air or oxygen-enriched air, are separately preheated to an elevated temperature and introduced in admixture with one another into a substantially completely closed compact reaction zone free from packing and catalyst and reacted with one another at a temperature above about 2,250° F. The reactants are preferably separately passed to the reaction zone and admixed with one another within the reactor. The reactants are preheated to the extent necessary to autogenously maintain the reaction temperature above 2,250° F. but less than about 3,000° F. The amount of oxygen-containing gas supplied to the reaction zone is maintained in excess of the amount required for conversion of all of the hydrocarbon to carbon monoxide and hydrogen, but considerably less than the amount required for complete combustion. By limiting the amount of uncombined oxygen supplied to the reaction zone, the quantity of hydrocarbon converted to carbon dioxide and water may be limited to a relatively low value.

We have found that it is possible to produce high yields of carbon monoxide and hydrogen with almost complete disappearance of hydrocarbons. The reaction is conducted in a compact, unpacked reaction zone having near-minimum internal surface maintained at a temperature above about 2,250° F. with air as the oxygen-containing gas. The reaction zone is free from packing and catalyst and has an internal surface area not greater than about 1.5 times the surface of a sphere of equal volume. The required conversion temperature, namely a temperature above 2,250° F., is autogenously maintained by preheating the reactants and by supplying an excess of oxygen over and above that amount required stoichiometrically for the conversion of all of the carbon in the hydrocarbon to carbon monoxide. The gas produced in the flow-type gas generator consists essentially of carbon monoxide, hydrogen, and nitrogen, together with small amounts of carbon dioxide and water vapor. The proportions of nitrogen to carbon monoxide and hydrogen, so produced, are in excess of that required for the synthesis of ammonia even when all of the carbon monoxide is replaced by hydrogen by the above-described water gas shift reaction. This gas is then combined with the gas from the steam-hydrocarbon reformer in relative amounts such that the resulting gas contains approximately three volumes of carbon monoxide and hydrogen per volume of nitrogen. Carbon monoxide is the equivalent, mol for mol, of hydrogen in the process. The gases from the flow generator are blended with the effluent gases from the primary reformer, preferably without reduction in temperature to permit interaction of the various gases and further reduce the hydrocarbon content of the product gas from the primary reformer, as will be evident from the more detailed description of the process hereinafter.

Usually the quantity of oxygen supplied to the reaction zone amounts to from about 1.4 to about 2.2 times the quantity stoichiometrically required to convert all of the carbon in the hydrocarbon to carbon monoxide.

Preferably, mixing of the hydrocarbon with air is accomplished entirely within the reaction zone by introducing separate streams of air, and the hydrocarbon as a gas or in vapor phase, so that they impinge upon one another while in the reaction zone while flowing at high velocity, i. e., a velocity within the range of from about 30 to about 300 feet per second.

The reaction zone is substantially completely closed or isolated by refractory insulation to retain heat therein to as large an extent as practical and to avoid substantially any heat loss by radiation. For operation at superatmospheric pressure the reaction zone is contained in a suitable pressure vessel provided with a refractory lining and means for cooling the walls of the vessel. If desired, means may be provided within the pressure vessel, but outside of the reaction zone proper, for cooling the product gas. This may suitably comprise a waste heat boiler in which steam may be generated for use in the process.

This application is a continuation-in-part of our co-pending application Serial No. 262,610, filed December 20, 1951 now U. S. 2,701,756.

Figure 1:
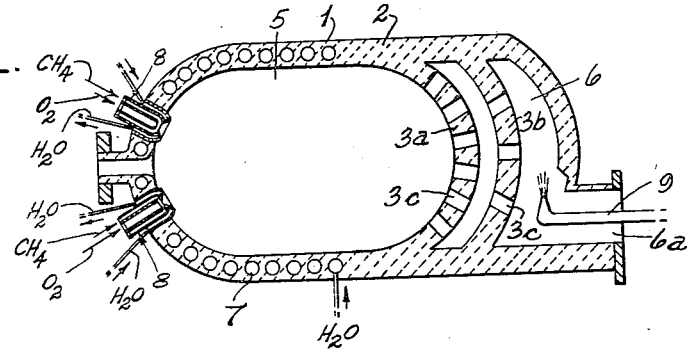
Figure 1 is a section taken along the longitudinal axis of a gas generator shown somewhat diagrammatically.

In Figure 1, the numeral 1 designates a cylindrical vessel lined with refractory material 2. A baffle formed of walls 3a and 3b is provided within the vessel to divide it into two sections, one section being the reaction zone 5 which, for example, is about 8 feet in length along its horizontal axis, with a radius of 2½ feet, while the other section 6 is used for cooling the resulting product gases. Walls 3a and 3b are designed to permit flow of reaction gases therethrough with no substantial drop in pressure while protecting the interior of the cooling section from direct radiation from the reaction section and insuring against loss of heat by radiation from the reaction zone, this being accomplished by the staggered arrangement of the openings 3c.

A cooling coil 7 is embedded in the refractory lining of the reaction section and adapted for the circulation therethrough of water, or any other fluid heat carrier, the purpose being to prevent overheating of the metal shell. The heat, so absorbed, may be used for preheat purposes and for steam or power generation for use elsewhere in the process.

Figure 2:
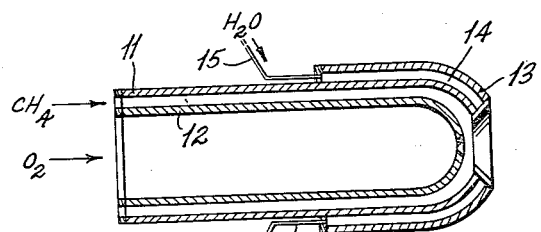
Figure 2 is a longitudinal section of a preferred form of gas feeder.

The reactant gases are introduced to the reaction zone through a plurality of gas feeders 8 which are described in more detail in connection with Figure 2.

The reaction products are discharged from the generator through passages 3c into cooling section 6 where they are reduced to a temperature suitable for introduction to an intermediate storage facility or to the synthesis reactor by a water spray 9 or by suitable heat exchange, not illustrated.

Figure 3:
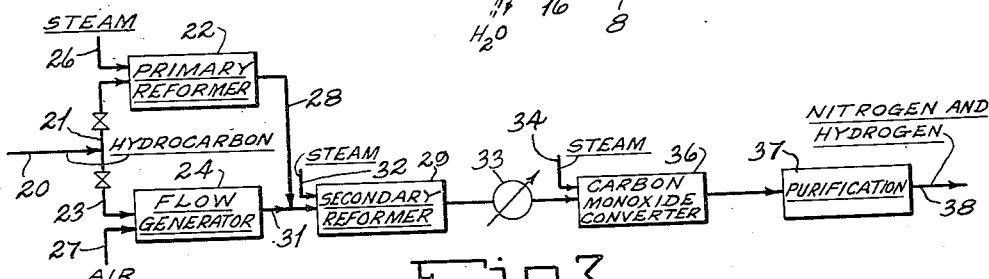
Figure 3 is a diagrammatic flow sheet illustrating one embodiment of the process of the present invention.

The gas feeders 8, as indicated in Figure 3, comprise essentially two concentric tubes 11 and 12 terminating in a water cooled tip 13. Thus, the tip 13 is of hollow construction having a water space 14 to which water is introduced through a tube 15 and removed through a tube 16.

One of the reactant gases flows through the annular space between the tubes 11 and 12, while the other reactant flows through the interior of the inner tube 12. Thus methane may flow through the annular space, while oxygen flows through the inner passage, or vice versa. Thus, the methane and oxygen streams impinge upon each other at the point of discharge from the tip 13 which is just inside the reaction zone. As indicated in Figure 1, the feeder tips may be substantially flush with the interior surface of the refractory lining of the vessel 1.

In operation there is a small zone of blue flame, immediately adjacent the tip, while in the rest of the reaction zone there is no visible flame. It is in this small region where blue flame exists, and where as much as 25 percent of the entering methane may undergo relatively complete combustion, forming carbon dioxide and water vapor which products subsequently react with additional methane in the reaction zone to form carbon monoxide and hydrogen.

There may be a plurality of the feeders 8. For example, there may be several uniformly disposed in the end of the vessel 1.

Figure 3 illustrates one preferred embodiment of the present invention. With reference to this figure, a hydrocarbon from a suitable source, e. g., natural gas, is supplied through line 20. A part of the hydrocarbon is directed through line 21 to a steam-hydrocarbon reformer 22. A second stream of the hydrocarbon is directed through line 23 to a flow generator 24 of the type illustrated in Figures 1 and 2. Steam is introduced to the reformer through line 26 and air is introduced into the flow generator through line 27.

The reformer 22 is conventional in design and operation to effect reaction of hydrocarbon with steam at a temperature within the range of from about 1,200° F. to about 1,500° F. in the presence of a nickel oxide catalyst. The effluent gas from the reformer, comprising mainly carbon monoxide and hydrogen, and containing some residual hydrocarbon, is passed through line 28 to a secondary reformer 29. Hot gaseous effluent from the flow generator, comprising nitrogen, carbon monoxide and hydrogen, and containing some carbon dioxide and water vapor, is discharged through line 31. This gas is admixed with the gas from the primary reformer and passed to the secondary reformer. Optionally, steam may be added to the secondary reformer through line 32. The usual catalyst, e. g., nickel oxide, may be used in the secondary reformer. The secondary reformer is preferably maintained at a temperature above about 1,800° F.; higher temperatures are desirable. The secondary reformer permits interaction of the gas streams; driving the hydrocarbon conversion nearer completion.

The gaseous effluent from the secondary reformer is passed to a heat exchanger 33 where its temperature is reduced to the approximate temperature required for the water gas shift reaction. The cooled gas stream is mixed with steam introduced through line 34 and passed to the carbon monoxide converter 36 where carbon monoxide is converted to carbon dioxide by reaction with steam, producing additional hydrogen. This step is conventional. From 90 to 95 percent of the carbon monoxide is converted to carbon dioxide in the carbon monoxide converter. Following the conversion of carbon monoxide, the gases are passed to a conventional purification system 37 to effect removal of carbon oxides from the gas stream. A mixture of nitrogen and hydrogen in the proportions required for the synthesis of ammonia, i. e., three volumes of hydrogen per volume of nitrogen, is discharged through line 38.

The quantity of air and hydrocarbon supplied to the flow generator is determined by the nitrogen requirements in the system. All of the nitrogen comes from the air supplied to the flow generator. The flow generator is supplied with fuel, as described above, in proportions such that a mixture of carbon monoxide, nitrogen, and hydrogen is produced. With air, from about 0.4 to about 0.7 volumes of carbon monoxide and hydrogen are produced for each volume of nitrogen supplied by the flow generator.

Figure 4:
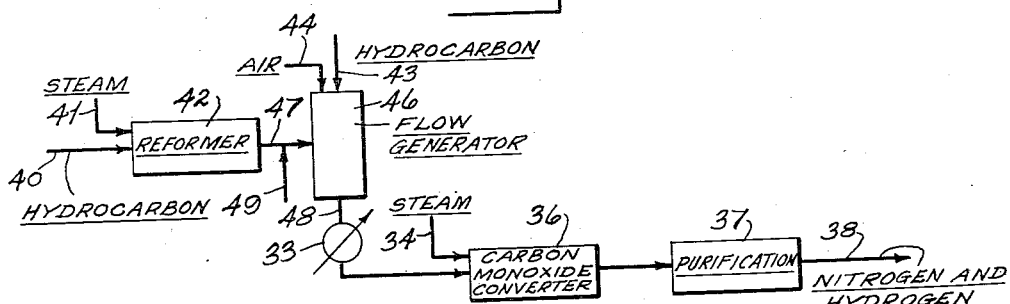
Figure 4 is a diagrammatic flow sheet illustrating a second embodiment of the process of the present invention.

An alternative preferred embodiment of the present invention is illustrated in Figure 4. In accordance with this embodiment, hydrocarbon and steam are supplied through lines 40 and 41, respectively, to a hydrocarbon-steam reformer 42. Hydrocarbon and air are supplied through lines 43 and 44, respectively, to a flow generator 46. The effluent gases from the reformer 42 are passed through line 47 into the flow generator. These gases preferably are introduced at a point intermediate the point of introduction of the hydrocarbon and air to the generator and the point of discharge of the gases from the generator through line 48. Optionally, additional steam may be introduced through line 49 into the flow generator into admixture with the gases from the reformer 42.

In this embodiment of the process the gases from the reformer and the gases produced by the interaction of a hydrocarbon with air in the flow generator are interacted at relatively high temperatures to bring the resulting composite product into equilibrium. By admixing the gases from the reformer with the hot gaseous product resulting from the reaction of hydrocarbon with air in the flow generator, additional reaction between unconverted hydrocarbon in the reformer effluent and steam and carbon dioxide may be obtained in the absence of a catalyst. It is possible, therefore, to eliminate the secondary reformer. The gases discharged from the flow generator through line 48 are passed to cooler 33, carbon monoxide converter 36 and gas purification unit 37, as described in connection with Figure 3. It will be evident that the equilibrium reactions between the gases from reformer 42 and from flow generator 46 may, if desired, be accomplished in a separate reaction vessel.

The following examples illustrate the application of the process of the present invention to the generation of feed gas for the synthesis of ammonia. Natural gas of the following composition is used:

| | Mol percent |
|---|---|
| Methane | 87.13 |
| Ethane | 7.88 |
| Propane | 1.67 |
| Heavier hydrocarbons | 0.35 |
| Carbon dioxide | 1.09 |
| Nitrogen | 1.88 |

This natural gas is fed at the rate of 127 mols per hour to a flow generator of the type described herein, wherein it is reacted with air. The generator temperature is maintained at about 2,600° F. in each example. Both the air and the natural gas are preheated to the same temperature, indicated in the following table:

| | Examples | | |
|---|---|---|---|
| | I | II | III |
| Natural gas, mols per hour | 127.0 | 127.0 | 127.0 |
| Air, mols per hour | 602.4 | 562.3 | 535.4 |
| Preheat, ° F | 910 | 1,100 | 1,255 |
| O/C ratio | 1.675 | 1.564 | 1.489 |

From the foregoing table it will be evident that as the preheating of the reactants is increased, the quantity of air required to maintain the reaction temperature is decreased.

The product gas composition on a water-free basis is approximately as follows:

|                  | Examples |      |      |
|------------------|----------|------|------|
|                  | I        | II   | III  |
| Carbon Monoxide  | 15.2     | 15.9 | 16.5 |
| Hydrogen         | 20.9     | 23.2 | 24.7 |
| Nitrogen         | 61.2     | 58.4 | 56.6 |
| Carbon Dioxide   | ¹ 2.6    | ¹ 2.3 | ¹ 2.0 |
| Methane          | 0.2      | 0.2  | 0.2  |

¹ NOTE.—Some carbon dioxide lost with the water due to the method of sampling.

On the basis of 100 mols of ammonia produced, the following relative amounts are required from the flow generator and the steam-hydrocarbon reaction:

*Carbon monoxide plus hydrogen per 100 mols ammonia*

| Source of Carbon Monoxide and Hydrogen | Examples |       |       |
|----------------------------------------|----------|-------|-------|
|                                        | I        | II    | III   |
| Flow Generator (mols)                  | 29.4     | 33.4  | 36.4  |
| Steam-Hydrocarbon Reformer (mols)      | 120.6    | 116.6 | 113.6 |

On the basis of the amount of hydrogen and carbon monoxide (taken as equivalent of hydrogen) produced by the steam-hydrocarbon reaction, the amount of ammonia-synthesis feed gas obtained by our process, as compared with supplying all of the nitrogen as pure nitrogen is increased by 24.4, 28.6, and 32.0 percent, respectively, for each of the foregoing examples. Thus it will be evident that our process, as compared with a conventional process in which relatively pure nitrogen, for example, nitrogen obtained from flue gas, is added to the carbon monoxide and hydrogen produced in a steam-hydrocarbon plant results in a large increase in the amount of ammonia-synthesis feed gas available from a steam-hydrocarbon installation of given size. Compared with the conventional practice of introducing air into the product of the steam-hydrocarbon reforming (which results in a loss of 17.7 percent of the hydrogen), the present process increases the amount of ammonia feed gas by 46.4, 51.4, and 55.4 percent respectively, for each of the foregoing examples. It is evident from the foregoing that the process of the present invention possesses a number of advantages in comparison with conventional processes.

Obviously many modifications and variations of the invention, as hereinbefore set forth, may be made without departing from the spirit and scope thereof and, therefore, only such limitations should be imposed as are indicated in the appended claims.

We claim:

1. A process for the production of a mixture of hydrogen and nitrogen in the approximate proportions of three volumes of hydrogen per volume of nitrogen, which comprises, in combination, reacting a gasiform hydrocarbon with steam at a temperature above about 1200° F. in a reforming step in contact with a catalyst effective for conversion of the hydrocarbon and steam directly into carbon monoxide and hydrogen under conditions such that said hydrocarbon is substantially completely converted with the steam into carbon monoxide and hydrogen, reacting a hydrocarbon non-catalytically with air at a temperature above about 2,250° F. in relative proportions such that said hydrocarbon is substantially completely converted to approximately maximum quantities of carbon monoxide and hydrogen producing a mixture of nitrogen, hydrogen, and carbon oxides; blending the products of reaction from said air-hydrocarbon reaction with the products of reaction from said hydrocarbon-steam reforming reaction without the addition of air thereto in relative proportions such that the resulting mixture comprises approximately three volumes of carbon monoxide and hydrogen per volume of nitrogen; converting carbon monoxide in said mixture substantially completely to carbon dioxide by reaction with steam concomitantly producing hydrogen; and removing steam, carbon dioxide and residual carbon monoxide from the gas stream thereby producing a gaseous mixture of hydrogen and nitrogen containing approximately three volumes of hydrogen per volume of nitrogen.

2. A process according to claim 1 wherein a pressure of at least 100 pounds per square inch gauge is maintained in the air-hydrocarbon reaction zone.

3. A process according to claim 1 in which effluent gases from the reforming step are combined with gaseous effluent from the air-hydrocarbon reaction step at substantially their respective reaction temperatures, and the resulting composite mixture is subjected at the resulting temperature to further reaction thereby effecting reaction between steam and hydrocarbon contained in said mixture.

4. A process for the production of hydrogen and nitrogen in the approximate ratio of three volumes of hydrogen per volume of nitrogen, which comprises, in combination, reacting a gasiform hydrocarbon with steam at a temperatures above about 1200° F. in a reforming step in the presence of a catalyst effective for conversion of hydrocarbon and steam directly to carbon monoxide and hydrogen under conditions effective for substantial reaction between said steam and hydrocarbon producing a mixture of carbon monoxide and hydrogen containing unreacted methane and steam; reacting a hydrocarbon non-catalytically with air at a temperature above about 2250° F. in a separate reaction zone free from packing and catalyst in relative proportions effective to yield approximately maximum quantities of hydrogen and carbon monoxide producing a mixture of carbon monoxide, hydrogen and nitrogen; blending effluent gases from the hydrocarbon-steam reforming step with gaseous effluent from the air-hydrocarbon reaction step without the addition of air thereto substantially their respective reaction temperatures in proportions such that the composite mixture contains approximately three volumes of carbon monoxide and hydrogen per volume of nitrogen; passing the resulting mixture at a temperature above about 1800° F. into a separate reaction zone into contact with a catalyst effective for promotion of reaction between steam and hydrocarbons; converting carbon monoxide in said mixture substantially completely to carbon dioxide by reaction with steam concomitantly producing hydrogen; and removing steam, carbon dioxide and residual carbon monoxide from the gas stream thereby producing a gaseous mixture of hydrogen and nitrogen containing approximately three volumes of hydrogen per volume of nitrogen.

5. A process according to claim 4 wherein additional steam is introduced into the last-mentioned separate reaction zone.

References Cited in the file of this patent
UNITED STATES PATENTS

| 1,874,801 | Porter | Aug. 30, 1932 |
| 2,051,363 | Beekley | Aug. 18, 1936 |
| 2,135,694 | Bardwell et al. | Nov. 8, 1938 |
| 2,582,938 | Eastman et al. | Jan. 15, 1952 |
| 2,610,106 | Gray | Sept. 9, 1952 |